N. LEE.
UNIVERSAL JOINT.
APPLICATION FILED MAR. 14, 1919.
1,396,132.
Patented Nov. 8, 1921.
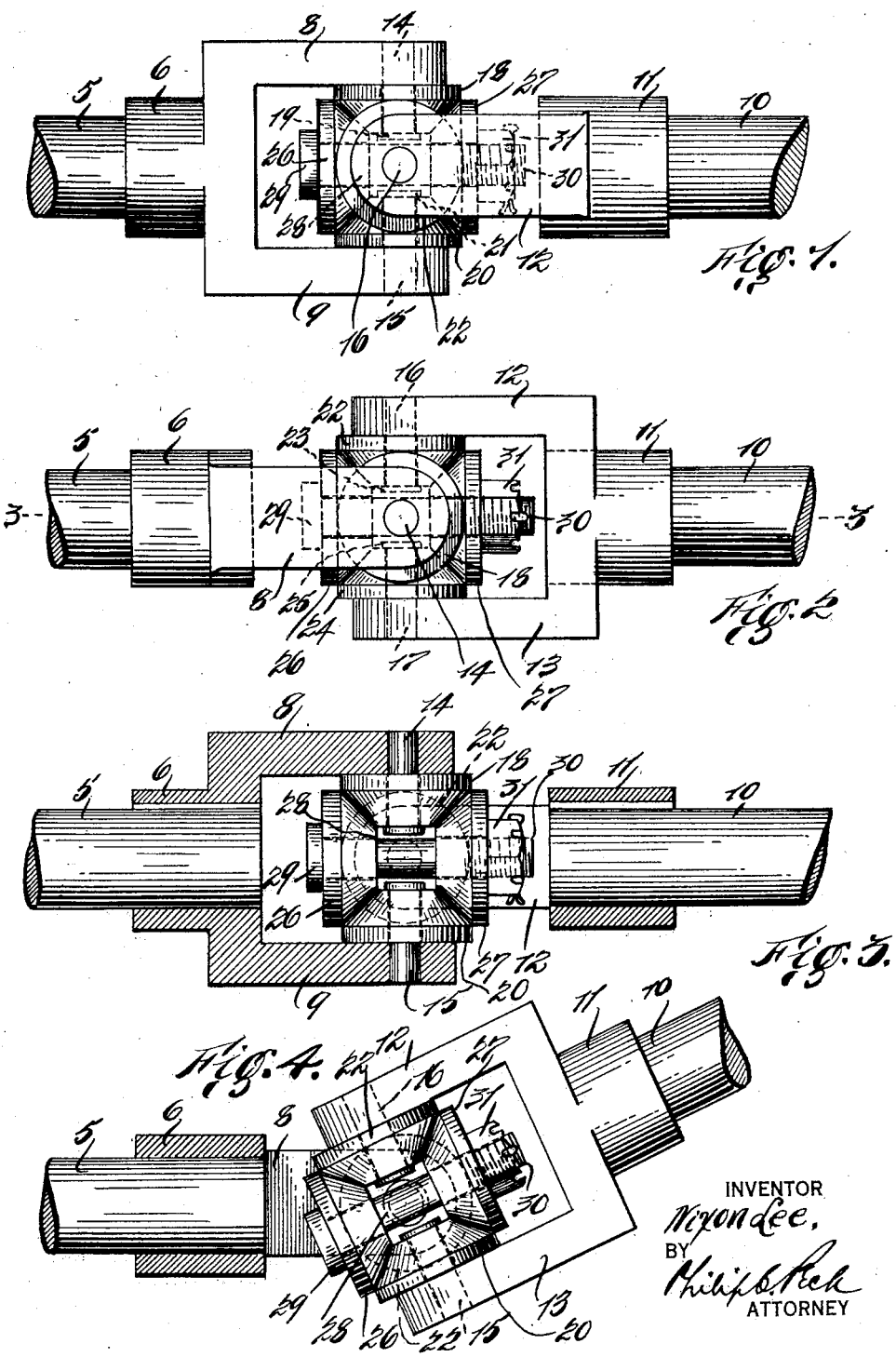
INVENTOR
Nixon Lee,
BY
Philip B. Peck
ATTORNEY

UNITED STATES PATENT OFFICE.

NIXON LEE, OF BROOKLYN, NEW YORK.

UNIVERSAL JOINT.

1,396,132.  Specification of Letters Patent.  Patented Nov. 8, 1921.

Application filed March 14, 1919. Serial No. 282,554.

*To all whom it may concern:*

Be it known that I, NIXON LEE, a citizen of the United States, and a resident of the borough of Brooklyn, in the county of Kings and State of New York, have invented certain new and useful Improvements in Universal Joints, of which the following is a specification, reference being made to the accompanying drawings, forming a part thereof.

My invention relates to those universal joint mechanisms which are devised and used for joining two shafts or parts of a machine endwise so that one member may give rotary motion to the other member when forming an angle with it, or may move freely in all directions with respect to the other member while maintaining its adaptability to transmit operative movements to such other shaft or other member of the machine.

The objects of my invention are, among other things, to provide a universal joint which shall combine a minimum of operative parts to effect the required movements in all positions of the driving and driven members, the parts of which may be readily taken apart for cleaning and adjustment, and which may be compactly assembled and maintained in operative position by adjustable means which are also devised to take up any looseness or "slack" in the coacting parts, due to wear or from any other cause. Another object of my invention is to provide a simple, efficient and durable universal joint in which there is a minimum amount of wear, and also less likelihood of cramping of the parts when the two shafts or members are rotating, or coacting with each other, out of alinement.

With these and other objects in view, as will more fully hereinafter appear, my invention consists in certain novel features of construction and arrangement of parts, hereinafter described, illustrated in the accompanying drawings, and particularly pointed out in the appended claims.

I attain these advantageous results by the universal joint shown in the accompanying drawings in which—

Figure 1 is an elevational view of a preferred embodiment of my invention;

Fig. 2 is a top plan view of the device shown in Fig. 1;

Fig. 3 is a longitudinal sectional view taken on the line 3—3 of Fig. 2, the cones and shafts being shown in elevation; and Fig. 4 is a diagrammatic view showing the position and action of the cones when the two shafts are out of alinement.

Similar numerals refer to similar parts throughout the several figures.

Referring to the drawings, the driving shaft 5 has the collar 6 affixed thereto, such collar 6 having mounted thereon two similar outwardly projecting jaws 8 and 9 respectively, as shown in Figs. 1 and 3. In like manner the driven shaft 10 has the collar 11 affixed thereto, such collar 11 also having mounted thereon two similar outwardly projecting jaws 12 and 13 respectively, as shown in Figs. 2 and 4. It is manifest that the separate shafts may have their respective collars and projecting jaws made integral with one another and in the present embodiment the collars and jaws are shown as integral parts of my device. Projecting inwardly from the jaws 8 and 9 are secured bolts 14 and 15 respectively, which bolts are arranged and affixed to their respective jaws in exact axial alinement. In like manner I secure inwardly projecting bolts 16 and 17 to the jaws 12 and 13 respectively, the bolts 16 and 17 also being arranged and affixed to their respective jaws in exact axial alinement.

Mounted on the bolt 14 is secured the block 18 formed in the shape of a truncated cone, the angle of its conical surface being inclined substantially 45 degrees from the vertical axis of the cone and the bolt 14. This cone block member 18 is preferably mounted on the bolt 14 so as to be capable of rotating on the bolt 14 which has the head 19 to hold the cone 18 in rotatable position. In like manner the bolt 15 has mounted thereon the cone block member 20 of a similar size and shape as the cone member 18, the bolt 15 having the head 21 formed on its inner end to rotatably hold the member 20 in position as shown in Fig. 1. In like manner as shown in Fig. 2, the bolt 16 has mounted thereon the cone block member 22, the bolt 16 having the head 23 formed on its inner end to rotatably hold the member 22 in position; also the bolt 17 has mounted thereon the cone block member 24, the bolt 17 having the head 25 formed on its inner end to rotatably hold the member 24 in position. As shown in the figures, the several cone block members 18, 20, 22 and 24 are all of a similar size and contour of the conical surfaces; and are preferably mounted so as to rotate on their respective supporting bolts 14, 15, 16 and 17 within the projecting jaws of the driving shaft 5 and the driven shaft 10.

To hold the two sets of cone block members carried by the two shafts 5 and 10 in operative coacting position so that their respective axes of alinement will always intersect in any relative position of angularity of the two shafts 5 and 10, I have shown as a preferred embodiment of such holding means, the device best shown in Figs. 3 and 4. This holding device, whereby the cone block members carried by the two shafts 5 and 10 are maintained in proper operative position, comprises two cone-block members 26 and 27 each of a size and shape substantially the same as the cone block members 18, 20, 22 and 24 hereinbefore described. These cone members 26 and 27 are rotatably mounted on the bolt 28 having the head 29 with its outer end 30 screw-threaded to coact with the lock-nut 31. The bolt 28 is disposed between the four heads 19, 21, 23 and 25 of the respective bolts 14, 15, 16 and 17, as shown in Figs. 3 and 4, and the cone block members 26 and 27 fit in oppositely between the cone block members 18, 20, 22 and 24, the member 26 being arranged between the jaws 8 and 9, while the member 27 is located within the jaws 12 and 13. The lock-nut 31 is screwed on the bolt 28 to bring the two cone block members 26 and 27 in position so that their conical surfaces will bear with equal pressure upon the conical surfaces of all the four cone members 18, 20, 22 and 24 as shown in the figures. By means of this bolts 28 and lock-nut 31 construction I can adjust the pressure of the cone members 26 and 27 on their coacting cone members 18, 20, 22 and 24 carried by the jaws of the two shafts 5 and 10, and may also take up any looseness or slack occurring from any wear on the conical surfaces or from any other cause.

The operation of my device is obvious from the diagrammatic view shown in Fig. 4 where the shafts 5 and 10 are shown as being out of alinement, yet capable of transmitting rotary motion one to the other. As shown in this figure, the force or pressure from the driving shaft 5 is distributed through the jaws 8 and 9 to the cone blocks 18 and 20 carried by the bolts 14 and 15, and thence through the cone blocks 22 and 24 mounted on the bolts 16 and 17 carried by the jaws 12 and 13 to the driven shaft 10 to rotate the latter. The cone members 18, 20, 22 and 24 oscillate or slide over their contiguous blocks in attaining the required angle of operative rotation; the torque is transmitted through and by such cone blocks carried by the two shafts as aforesaid. The holding blocks 26 and 27 tend always to keep the axes of the respective sets of cone blocks so that they will intersect in all relative positions of angularity between the two shafts. This construction enables my universal joint to operate with less wear of the coacting parts and with less likelihood of cramping when in use than with other forms of universal joints now in use.

It will be understood that the universal joint herein shown and described is a preferred embodiment of my invention and that same may be modified and changed in its various details without departing from the principle and scope of my invention.

I claim as my invention:—

1. A universal joint comprising driving and driven members each provided with bifurcated jaws, inwardly projecting oppositely disposed conical blocks mounted on the jaws of each member, the respective sets of said blocks sliding over each other in all positions of said members, and means bearing on the coacting surfaces of said blocks for holding same in operative position.

2. A universal joint comprising driving and driven members each provided with bifurcated jaws, inwardly projecting oppositely disposed conical blocks rotatably mounted on the jaws of each member, the respective sets of said blocks sliding over each other in all positions of said members, and means bearing on the coacting surfaces of said blocks for holding same in operative position.

3. A universal joint comprising driving and driven members each provided with bifurcated jaws, inwardly projecting oppositely disposed conical blocks rotatably mounted on the jaws of each member, the respective sets of said blocks sliding over each other in all positions of said members, and means comprising a pair of similarly shaped conical blocks bearing against both said sets for holding said first-mentioned blocks in operative position.

4. A universal joint comprising driving and driven members each provided with bifurcated jaws, inwardly projecting oppositely disposed conical blocks mounted on the jaws of each member, the respective sets of said blocks sliding over each other in all positions of said members, and adjustable means for holding said blocks in operative position.

5. A universal joint comprising driving and driven members each provided with bifurcated jaws, inwardly projecting oppositely disposed conical blocks rotatably mounted on the jaws of each member, the respective sets of said blocks sliding over each other in all positions of said members, and adjustable means for holding said blocks in operative position.

6. A universal joint comprising driving and driven members each provided with bifurcated jaws, inwardly projecting oppositely disposed conical blocks rotatably mounted on the jaws of each member, the respective sets of said blocks sliding over each other in all positions of said members, and adjustable means bearing on the surfaces of said blocks for holding same in operative position.

7. A universal joint comprising driving and driven members each provided with bifurcated jaws, two transversely projecting oppositely disposed conical blocks mounted within the jaws of each member, the respective sets of blocks sliding over each other in all positions of said members, and means bearing on the coacting surfaces of said blocks for holding the respective sets of said blocks in such position that their axes of alinement will intersect in all relative positions of said driving and driven members.

8. A universal joint comprising driving and driven members each provided with bifurcated jaws, two transversely projecting oppositely disposed conical blocks rotatably mounted within the jaws of each member, the respective sets of blocks sliding over each other in all positions of said members, and means bearing on the coacting surfaces of said blocks for holding the respective sets of said blocks in such position that their axes of alinement will intersect in all relative positions of said driving and driven members.

9. A universal joint comprising driving and driven members each provided with bifurcated jaws, two transversely projecting oppositely disposed conical blocks rotatably mounted within the jaws of each member, the respective sets of blocks sliding over each other in all positions of said members, and means comprising a pair of similarly shaped conical blocks bearing against both said sets for holding the respective sets of said blocks in such position that their axes of alinement will intersect in all relative positions of said driving and driven members.

10. A universal joint comprising driving and driven members each provided with bifurcated jaws, two transversely projecting oppositely disposed conical blocks mounted within the jaws of each member, the respective sets of blocks sliding over each other in all positions of said members, and means, comprising a pair of conical blocks carried by a bolt passing between the four conical blocks mounted on said jaws, said pair of blocks bearing against each of said four blocks along their respective conical surfaces, for holding the respective sets of said blocks in such position that their axes of alinement will intersect in all relative positions of said driving and driven members.

11. A universal joint comprising driving and driven members each provided with bifurcated jaws, two transversely projecting oppositely disposed conical blocks mounted within the jaws of each member, the respective sets of blocks sliding over each other in all positions of said members, and means, comprising a pair of conical blocks rotatably carried by a bolt passing between the four conical blocks mounted on said jaws, said pair of blocks bearing against each of said four blocks along their respective conical surfaces, for holding the respective sets of said blocks in such position that their axes of alinement will intersect in all relative positions of said driving and driven members.

12. A universal joint comprising driving and driven members each provided with bifurcated jaws, two transversely projecting oppositely disposed conical blocks mounted within the jaws of each member, the respective sets of blocks sliding over each other in all positions of said members, means, comprising a pair of conical blocks rotatably carried by a bolt passing between the four conical blocks mounted on said jaws, said pair of blocks bearing against each of said four blocks along their respective conical surfaces, for holding the respective sets of said blocks in such position that their axes of alinement will intersect in all relative positions of said driving and driven members, and means for adjusting the positions of said conical blocks against said transversely projecting blocks carried by said jaws.

13. A universal joint comprising driving and driven members each provided with bifurcated jaws, inwardly projecting oppositely disposed blocks rotatably mounted within the jaws of each member, the respective sets of said blocks sliding over each other in all positions of said members, and means bearing on the coacting surfaces of said blocks for holding same in operative position.

14. A universal joint comprising driving and driven members each provided with bifurcated jaws, inwardly projecting oppositely disposed blocks rotatably mounted within the jaws of each member, the respective sets of said blocks sliding over each other in all positions of said members, and adjustable means for holding said blocks in operative position.

15. A universal joint comprising driving and driven members each provided with bifurcated jaws, inwardly projecting oppositely disposed blocks rotatably mounted within the jaws of each member, the respective sets of said blocks sliding over each other in all positions of said members, and means comprising a pair of similarly shaped conical blocks bearing against both said sets for holding the respective sets of said blocks in such position that their axes of alinement will intersect in all relative positions of said driving and driven members.

16. A universal joint comprising driving and driven members each provided with bifurcated jaws having oppositely disposed blocks mounted within the jaws of each member, the respective sets of said blocks sliding over each other in all positions of said members, and adjustable means bearing on said blocks for holding same in operative position.

17. A universal joint comprising driving and driven members each provided with bifurcated jaws having oppositely disposed blocks mounted within the jaws of each member, each block sliding over is contiguous blocks, and means bearing on the coacting surfaces of said blocks for holding same in operative position in all positions of said members.

18. A universal joint comprising driving and driven members each provided with bifurcated jaws having inwardly projecting oppositely disposed conical blocks mounted within the jaws of each member, each block sliding over its contiguous blocks, and means bearing on the coacting surfaces of said blocks for holding same in operative position in all positions of said members.

NIXON LEE.